United States Patent [19]
Sakaki

[11] Patent Number: 6,035,357
[45] Date of Patent: Mar. 7, 2000

[54] IC CARD COMPATIBLE WITH DIFFERENT SUPPLY VOLTAGES, IC CARD SYSTEM COMPRISING THE SAME, AND IC FOR THE IC CARD

[75] Inventor: Kinya Sakaki, Tokyo, Japan

[73] Assignee: Kabushiki Kaisha Toshiba, Kawasaki, Japan

[21] Appl. No.: 08/868,154

[22] Filed: Jun. 3, 1997

[30]     Foreign Application Priority Data

Jun. 7, 1996   [JP]   Japan ................................. P8-145894

[51] Int. Cl.[7] ...................................................... G06F 13/00
[52] U.S. Cl. ........................... 710/102; 713/100; 713/322
[58] Field of Search ................................... 713/322–340, 713/100; 710/102, 103

[56]             References Cited

U.S. PATENT DOCUMENTS

| | | | |
|---|---|---|---|
| 4,772,783 | 9/1988 | Ono et al. ................................ | 235/492 |
| 4,879,529 | 11/1989 | Schroth et al. ............................ | 331/14 |
| 4,964,011 | 10/1990 | Sternglass .................................. | 361/88 |
| 4,968,899 | 11/1990 | Katsutani et al. ......................... | 327/99 |
| 5,034,599 | 7/1991 | Hirata ....................................... | 235/438 |
| 5,490,117 | 2/1996 | Oda et al. ................................. | 365/226 |
| 5,541,985 | 7/1996 | Ishii et al. ................................. | 379/111 |
| 5,688,134 | 11/1997 | Hirata ....................................... | 439/136 |
| 5,689,430 | 11/1997 | Ohno et al. ............................... | 702/64 |
| 5,712,754 | 1/1998 | Sides et al. ............................... | 361/58 |
| 5,714,873 | 2/1998 | Hwang ..................................... | 323/273 |
| 5,773,901 | 6/1998 | Kantner .................................... | 307/125 |
| 5,822,387 | 10/1998 | Mar .......................................... | 375/376 |
| 5,822,596 | 10/1998 | Casal et al. ............................... | 713/322 |
| 5,838,929 | 11/1998 | Tanikawa ................................. | 710/102 |

FOREIGN PATENT DOCUMENTS 7-161929   6/1995   Japan .

*Primary Examiner*—Paul R. Myers
*Attorney, Agent, or Firm*—Oblon, Spivak, McClelland, Maier & Neustadt, P.C.

[57]                  ABSTRACT

An IC card has a peripheral circuit and a CPU. The peripheral circuit has a memory for storing data. The CPU controls various operations including an access operation of the memory. The IC card receives a supply voltage and a clock signal from an external unit. The IC card has a detector for detecting the supply voltage, a tester for testing the detected supply voltage, and an adjuster for adjusting the peripheral circuit according to a result of the voltage test. With these arrangements, the IC card stably operates on a wide range of supply voltages and is capable of coping with a fluctuation in the supply voltage. The tester may be incorporated in the CPU as one of functions thereof or may be realized by hardware that is arranged outside the CPU. The IC card and external unit constitute an IC card system.

21 Claims, 14 Drawing Sheets

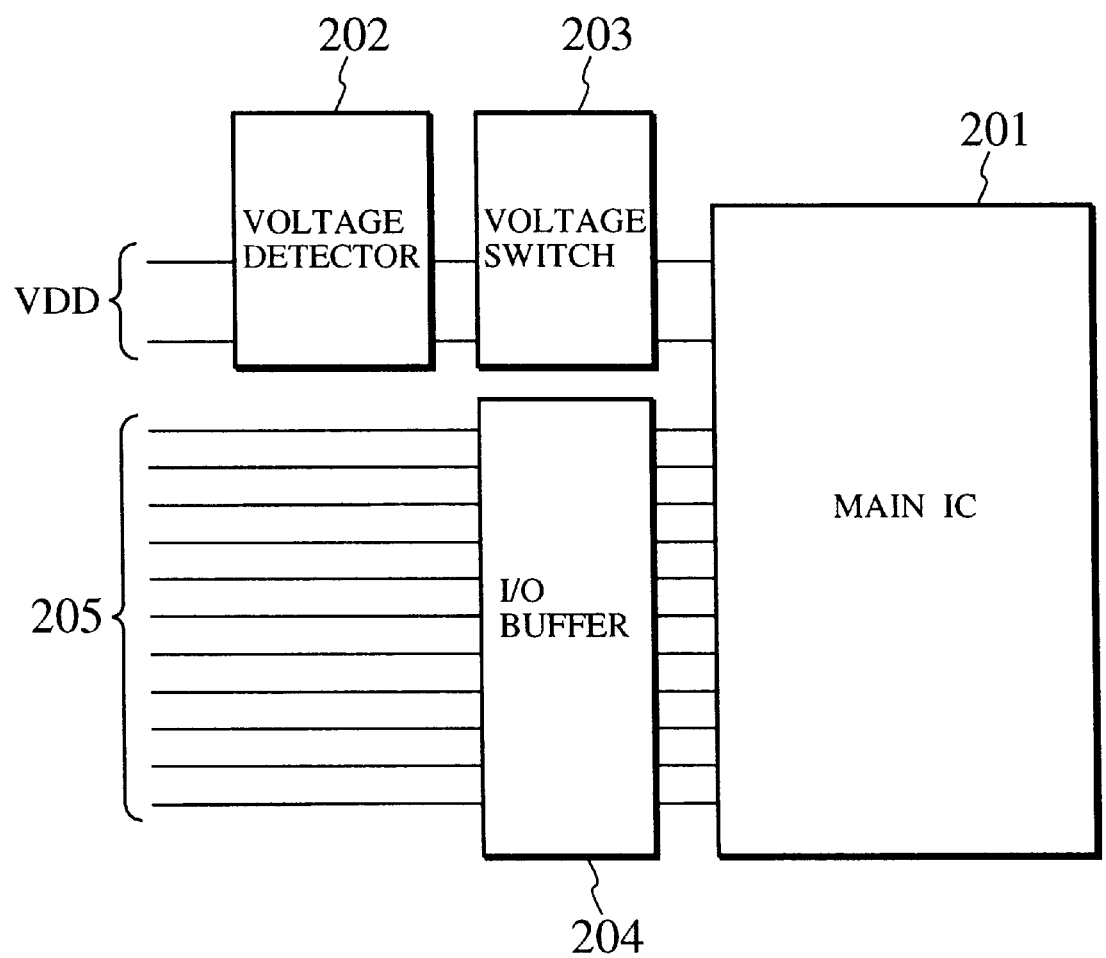

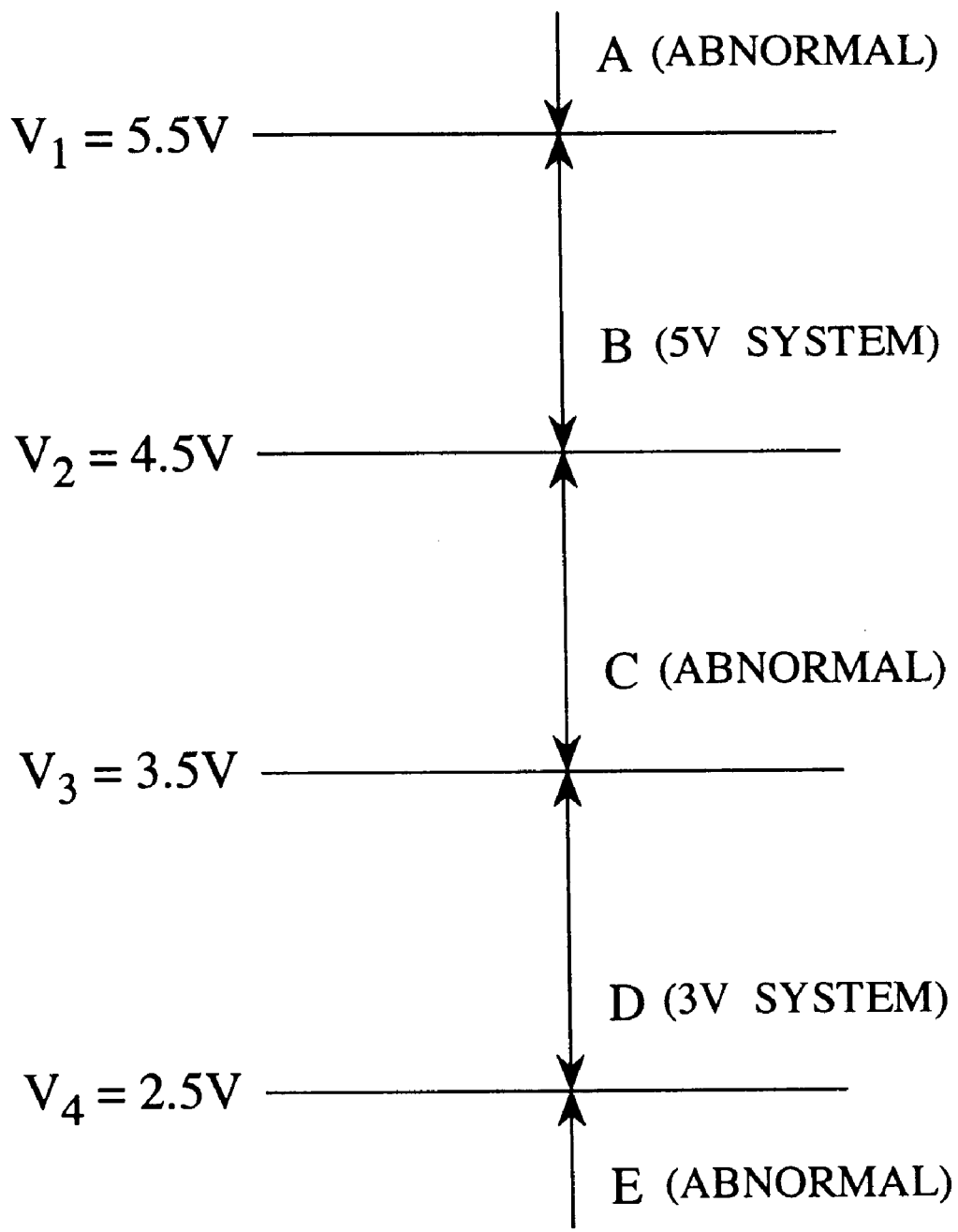

IC CARD COMPATIBLE WITH DIFFERENT SUPPLY VOLTAGES, IC CARD SYSTEM COMPRISING THE SAME, AND IC FOR THE IC CARD

BACKGROUND OF THE INVENTION

1. Field of the Invention

The present invention relates to an integrated circuit (IC) card, an IC card system, and an IC for the IC card, those operating with various supply voltages.

2. Description of the Prior Art

An IC card is a plastic card that incorporates an IC chip monolithically integrating a microcomputer circuit and a memory circuit. FIG. 1 shows an IC card system according to a prior art. The system includes an IC card 10 and a reader-writer 30 that receives and ejects the IC card 10. The reader-writer 30 is connected to a host computer (not shown), to mediate between the IC card 10 and the host computer.

The IC card 10 has terminals 11 to 15 to be connected to contact pins 31 to 35 of the reader-writer 30. The IC card 10 incorporates an IC chip monolithically integrating various circuits such as a central processing unit (CPU) 106 and a peripheral circuit 107 that includes an EEPROM 107a. The CPU 106 controls an interface with respect to the reader-writer 30 through the terminals 11 to 15 and an access operation on the EEPROM 107a.

The reader-writer 30 provides the IC card 10 with a supply voltage VDD, a clock signal CLK, and a reset signal RST. The reader-writer 30 has a control circuit 36 that controls the reception and ejection of the IC card 10 and data communication with the IC card 10 and host computer.

Recent LSIs employ smaller feature sizes and lower supply voltages. The operation voltage of LSI is migrating from 5 Volts to 3 Volts, or further 3 Volts to 2 Volts and below. Various manufacturers provide LSIs operating with different supply voltages. Accordingly, IC cards are required to operate on different supply voltages. Reader-writers of different manufacturers provide different supply voltages, and therefore, IC cards are required to stably operate on a wide range of supply voltages. FIG. 2 shows an example of an IC that operates on different supply voltages. This IC is disclosed in Japanese Unexamined Patent Publication No. 7-161929. The IC consists of a main IC 201, a voltage detector 202, a voltage switch 203, and an I/O buffer 204. The voltage switch 203 provides the main IC 201 with a predetermined low voltage even if an external supply voltage VDD fluctuates. The voltage switch 203 stepwise changes an operation voltage supplied to the I/O buffer 204 in response to a change in the supply voltage VDD detected by the voltage detector 202, thereby changing the amplitude of each I/O signal 205. This prior art controls only the voltage of each I/O signal in response to a change in the supply voltage VDD and is incapable of coping with phenomena ascribable to a change in the frequency of an input signal. If the frequency of any input signal fluctuates, the operation of the IC will be destabilized. If the main IC 201 receives a low supply voltage and if the frequency of a clock signal supplied to the main IC 201 exceeds the operating frequency of the main IC 201, the main IC 201 will be out of control. If a write instruction to write data into the EEPROM 107a is issued under this situation, data in the EEPROM will be destroyed.

To stabilize the operation of the IC card with respect to a wide range of supply voltages, the prior art must keep down the access conditions such as write conditions of the EEPROM 107a. For example, the prior art intentionally elongates a write time. This may increase power dissipation and lower the performance of the IC card system.

The prior art of FIG. 1 has no measures to cope with an abnormal supply voltage applied from the reader-writer 30 to the IC card 10. If the reader-writer 30 has a trouble such as quasi short-circuit in a part, the IC card 10, which operates on, for example, 5 V, may receive an abnormally low voltage of, for example, 3 V. In spite of the abnormally low supply voltage, the frequency of the clock signal CLK supplied to the IC card 10 is unchanged, i.e., high. On the other hand, the operating frequency of the CPU 106 of the IC card 10 usually drops as the supply voltage thereto drops, and therefore, the high-frequency clock signal destabilizes a write operation carried out by the CPU 106, or the CPU 106 may be out of control and destroy data in the EEPROM 107a.

SUMMARY OF THE INVENTION

An object of the present invention is to provide a semiconductor integrated circuit (IC) for an IC card, capable of stably operating on a wide range of supply voltages.

Another object of the present invention is to provide an IC card having an IC chip incorporating a CPU that is stable for a wide range of supply voltages.

Still another object of the present invention is to provide an IC card that is stable and maintains its performance for a wide range of supply voltages.

Still another object of the present invention is to provide an IC card system that is stable and maintains its performance for a wide range of supply voltages and quickly copes with an abnormal supply voltage.

In order to accomplish the objects, a first aspect of the present invention provides a semiconductor IC for an IC card. The IC consists of a detecting means, a testing means, and an adjusting means. The detecting means such as a voltage detector detects a supply voltage applied by an external unit to the IC card. The testing means such as a tester tests the detected supply voltage. The adjusting means such as an adjuster adjusts a given circuit contained in the IC card according to a result of the voltage test. The testing means and adjusting means are preferably incorporated into a CPU. The external unit may be a reader-writer that receives and ejects the IC card. "The given circuit" in the IC card may be a peripheral circuit incorporating a memory. The given circuit is preferably merged into a same semiconductor chip of the CPU and the testing means.

The first aspect optimizes the conditions of the given circuit in the IC card in response to the supply voltage, to stabilize the operation of the IC for a wide range of supply voltages.

The IC of the first aspect may have a means for notifying the external unit of the voltage test result. The notifying means is preferably incorporated in the CPU. Upon receiving it, the external unit quickly copes with an abnormality in the supply voltage, if any. The adjuster may adjust the access conditions of the memory of the IC card according to the voltage test result. The adjuster optimizes the access conditions of the memory in response to the supply voltage, so that the memory is stably accessed for a wide range of supply voltages. The IC of the first aspect may be connected to a clock dividing means disposed in the IC card. The clock dividing means may be merged into a same chip of CPU. If the voltage test result indicates that the supply voltage is abnormally low, the clock divider divides the frequency of the clock signal sent by the external unit, to prevent a CPU of the IC from becoming out of control.

A second aspect of the present invention provides an IC card that operates on a supply voltage applied by an external unit such as a reader-writer. The IC card has a peripheral circuit having a memory for storing data, a CPU for controlling various operations such as a memory access operation, and a means for detecting the supply voltage. The peripheral circuit, CPU and detecting means are preferable integrated in a same semiconductor chip. The CPU controls the operations in response to the detected supply voltage.

The second aspect optimizes the operation of the CPU in response to the detected supply voltage and stabilizes the operation of the IC card for a wide range of supply voltages. The external unit provides the IC card with signals such as a clock signal.

To optimize and stabilize the conditions of the peripheral circuit for a wide range of external voltages, the IC card may have a means for testing the voltage detected by the voltage detector and a means for adjusting the peripheral circuit in response to a result of the voltage test. The IC card may have a means for notifying the external unit of the voltage test result, so that the external unit may quickly cope with an abnormality in the supply voltage and prevent an accident.

An adjuster serving as the adjusting means of the second aspect may adjust the access conditions of the memory of the IC card according to the voltage test result. The adjuster optimizes the access conditions of the memory in response to the supply voltage, to stabilize a memory access operation for a wide range of supply voltages. The IC card may have a clock dividing means. If the voltage test result indicates that the supply voltage is abnormally low, the clock dividing means such as a clock divider divides the frequency of the clock signal supplied by the external unit, to provide a low-frequency clock signal. Then, the CPU operates on the low-frequency clock signal, and therefore, never runs out of control.

A third aspect of the present invention provides a system that employs the IC card of the second aspect. The system includes the IC card and an external unit. The external unit receives and ejects the IC card, applies a supply voltage and sends a clock signal to the IC card, and communicates data with the memory of the IC card. The IC card includes the peripheral circuit, CPU, and voltage detecting means. The peripheral circuit contains the memory such as EEPROM. The CPU controls various operations such as a memory access operation. A voltage detector serving as the voltage detecting means detects the supply voltage provided by the external unit. The CPU incorporates the means for testing the detected voltage, means for adjusting the peripheral circuit in response to a result of the voltage test, and means for notifying the external unit of the voltage test result. The voltage detector may be disposed outside the CPU. The external unit has a unit for disabling communication with the IC card or ejecting the IC card if the voltage test result indicates an abnormal voltage. The peripheral circuit, CPU and voltage detecting means may be monolithically integrated in a same semiconductor chip.

The third aspect optimizes the conditions of the peripheral circuit in response to the supply voltage and stabilizes the operation of the system for a wide range of supply voltages. The notifying means always notifies the external unit of the state of the supply voltage. If the supply voltage applied to the IC card is abnormal, the external unit quickly disables communication with the IC card or ejects the IC card. The adjusting means may adjust the access conditions of the memory of the peripheral circuit in response to the voltage test result, so that the memory is stably accessed for a wide range of supply voltages. The IC card may have dividing means such as a clock divider. If the voltage test result indicates that the supply voltage is abnormally low, the clock divider divides the frequency of the clock signal supplied by the external unit, to prevent the CPU from running out of control. The clock divider may be driven by the adjusting means.

The external unit of the third aspect quickly ejects the IC card if the supply voltage to the IC card is abnormally high, to minimize damage on the IC card. If the supply voltage to the IC card is abnormally low, the external unit disables communication with the IC card after a predetermined period, for example, after the completion of a write operation presently carried out on the memory of the IC card. Then, the memory correctly receives data without interruption. During this period, the frequency of the clock signal to the IC card is properly divided in response to the abnormally low voltage, to correctly carry out the write operation.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 2 is a block diagram showing a semiconductor IC according to the prior art;

FIG. 4 shows reference voltages for testing a supply voltage according to the first embodiment;

DETAILED DESCRIPTION OF THE EMBODIMENTS

Figure 1:
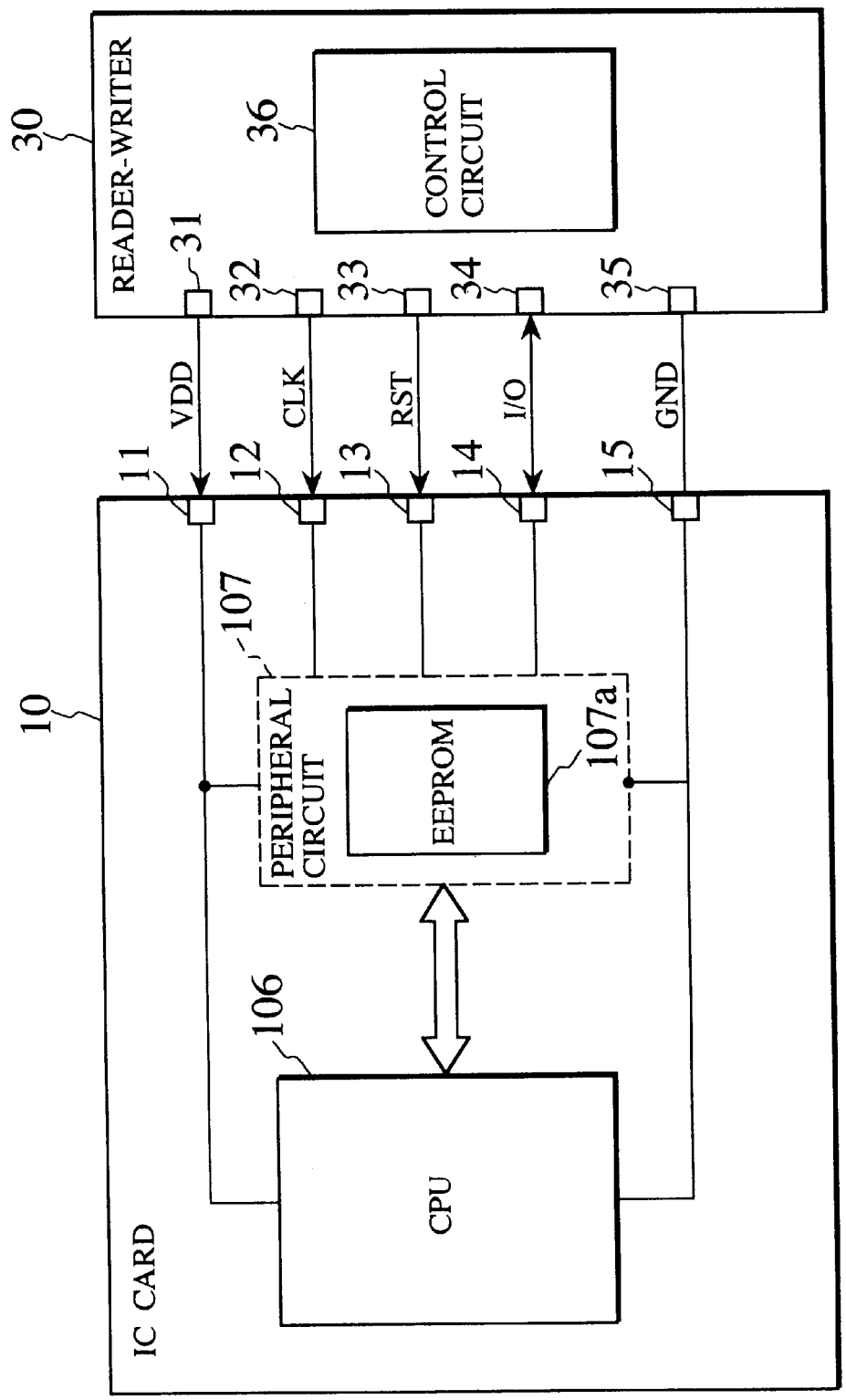
FIG. 1 is a block diagram showing the basic structure of an IC card system according to a prior art.

Various embodiment of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

Figure 3A:
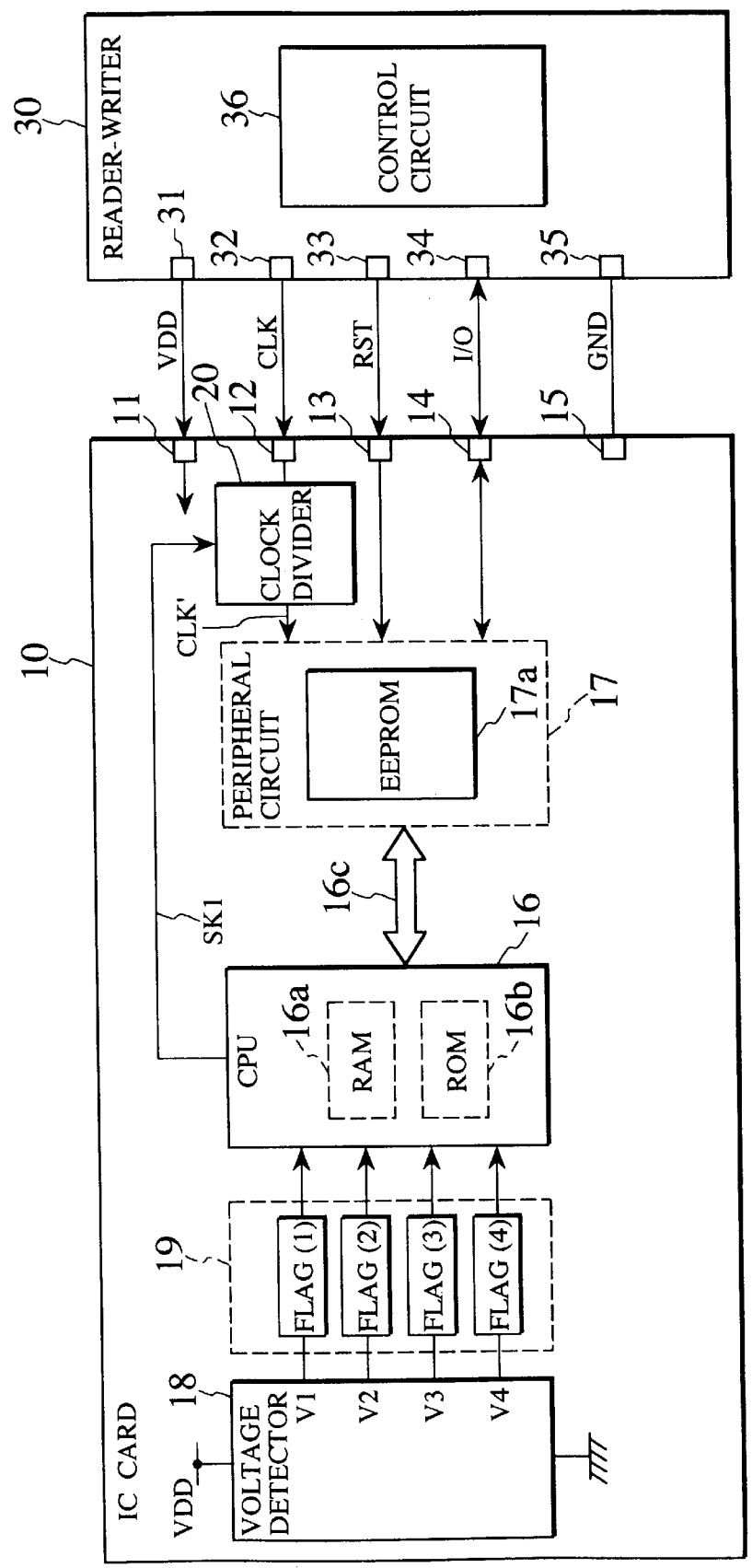
FIG. 3A is a block diagram showing an essential part of an IC card system according to a first embodiment of the present invention.

FIG. 3A is a block diagram showing an IC card system according to the first embodiment of the present invention. The system includes an IC card 10 and a reader-writer 30, which is an external unit. The reader-writer 30 mediates between the IC card 10 and a host computer (not shown). The reader-writer 30 receives and ejects the IC card 10, applies at least a supply voltage VDD and sends a clock signal CLK to the IC card 10, and communicates data with the IC card 10.

The IC card 10 has a semiconductor integrated circuit, monolithically integrating a CPU 16, a peripheral circuit 17, and a detecting means such as a voltage detector 18. The peripheral circuit 17 has a memory 17a for storing data. The CPU 16 controls various operations such as an access operation of the memory 17a in response to a request from the reader-writer 30. The voltage detector 18 serving as the detecting means detects the supply voltage VDD applied by the reader-writer 30. The CPU 16 has a tester serving as a means for testing the detected supply voltage and an adjuster serving as a means for adjusting the peripheral circuit 17 in response to a result of the voltage test. The IC card 10 has a terminal 11 for receiving the supply voltage VDD, a terminal 12 for receiving the clock signal CLK, a terminal 13 for receiving a reset signal RST, a terminal 14 for inputting and outputting data, and a terminal 15 for grounding. These terminals are exposed to the outside of the IC card 10. The CPU 16 has a RAM 16a serving as a work area and a ROM 16b serving as a program memory. The CPU 16 is connected to the peripheral circuit 17 through a bus 16c that may include an address bus, a data bus, and a control bus. The voltage detector 18 detects the supply voltage VDD applied through the terminal 11. The IC card 10 also has a flag holder 19 for holding the status of the detected supply voltage. The CPU 16, peripheral circuit 17, voltage detector 18 and flag holder 19 are merged into a single-chip IC.

The CPU 16 controls an interface with respect to the reader-writer 30 through the terminals 11 to 15 and accesses the EEPROM 17a. Further the CPU 16 has a voltage testing function, a peripheral circuit adjusting function, and a test result notifying function. The voltage testing function of the CPU 16 is a function to test the detected supply voltage. The peripheral circuit adjusting function adjusts the write conditions of the EEPROM 17a in response to a result of the voltage test carried out by the CPU 16. Then CPU 16 operates as a testing means (tester) and an adjusting means (adjuster). And the CPU 16 corresponds to a unit comprising the tester and adjuster. If the supply voltage VDD is tested and determined to be abnormally low, the frequency of the clock signal CLK must be divided. For this purpose, the present invention provides the IC card 10 with a clock dividing means such as a clock divider 20, which receives a clock adjusting signal SK1 from the adjuster to correct the conditions affected by a change in the supply voltage VDD. The voltage test result notifying function is achieved by the CPU 16 so that the CPU 16 serves as a notifying means, or a notifier. And we can say that the notifier is incorporated in the CPU 16. The notifier notifies the reader-writer 30 of the voltage test result. The clock divider 20 consists of, for example, a J-K flip-flop 21 and a selector 22 as shown in FIG. 3B.

The voltage detector 18 employs, for example, four reference voltages $V_1$ to $V_4$ to test the supply voltage VDD. The voltage detector 18 is composed of known parts such as comparators. FIG. 4 shows examples of the reference voltages $V_1$ to $V_4$. The examples are $V_1$=5.5 V, $V_2$=4.5 V, $V_3$=3.5 V, and $V_4$=2.5 V. The flag holder 19 holds the status of a voltage detected by the voltage detector 18. The flag holder 19 employs four flags (1) to (4) corresponding to the reference voltages $V_1$ to $V_4$. Each flag is 0 or 1. If the supply voltage VDD is between 4.5 V and 5.5 V, the flag (1) is 0, and the others are each 0. If VDD is between 2.5 V and 3.5 V, the flag (4) is 1, and the others are each 0. If VDD is above 5.5 V, the flags (1) to (4) are each 1. If VDD is between 3.5 V and 4.5 V, the flags (1) and (2) are each 0, and the flags (3) and (4) are each 1. If VDD is below 2.5 V, the flags (1) to (4) are each 0.

The status held in the flag holder 19 is transferred to the CPU 16, which determines whether or not the supply voltage VDD is normal. The reference voltages $V_1$ to $V_4$ of FIG. 4 are only examples and may be changed by software depending on the situation. In FIG. 4, a voltage range B between 4.5 V and 5.5 V is a normal range for a 5-V system. A voltage range D between 2.5 V and 3.5 V is a normal range for a 3-V system. A voltage range C between 3.5 V and 4.5 V, a voltage range A above 5.5 V, and a voltage range E below 2.5 V are each an abnormal range.

Figure 3B:
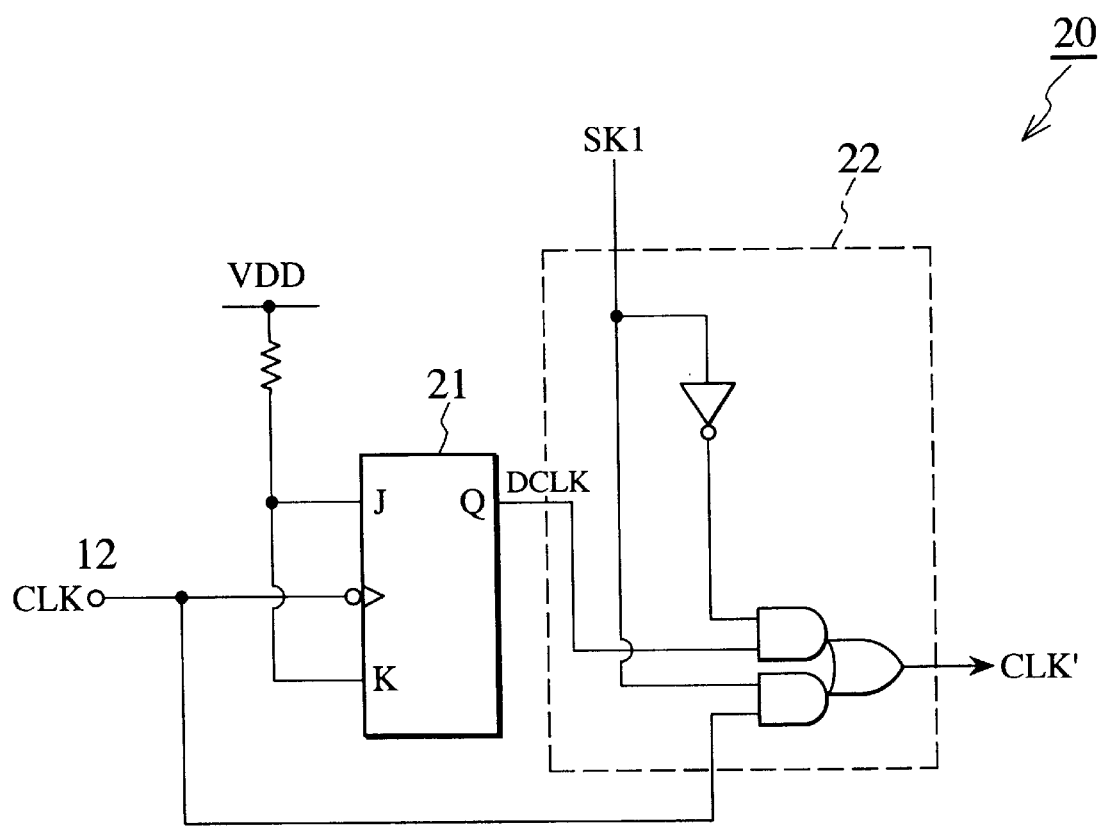
FIG. 3B is a circuit diagram showing a clock divider according to the first embodiment.

FIG. 3B shows an example of the clock divider 20. The J-K flip-flop 21 halves the frequency of the clock signal CLK and provides a frequency-halved clock signal DCLK. The selector 22 selects one of the clock signals CLK and DCLK in response to the clock adjusting signal SK1 provided by the CPU 16. The selected clock signal is supplied as an internal clock signal CLK'.

The reader-writer 30 has contact pins 31 to 35. The reader-writer 30 has a motor and a belt to automatically receive and eject the IC card 10. When the IC card 10 is inserted into the reader-writer 30, the pins 31 to 35 engage with the terminals 11 to 15 of the IC card 10.

The reader-writer 30 provides the terminals 11, 12, and 13 of the IC card 10 with the supply voltage VDD, clock signal CLK, and reset signal RST, respectively. The reader-writer 30 has a control circuit 36 that communicates data with the IC card 10 through the terminal 14, communicates data with the host computer (not shown), and controls the reception and ejection of the IC card 10.

Figure 5A:
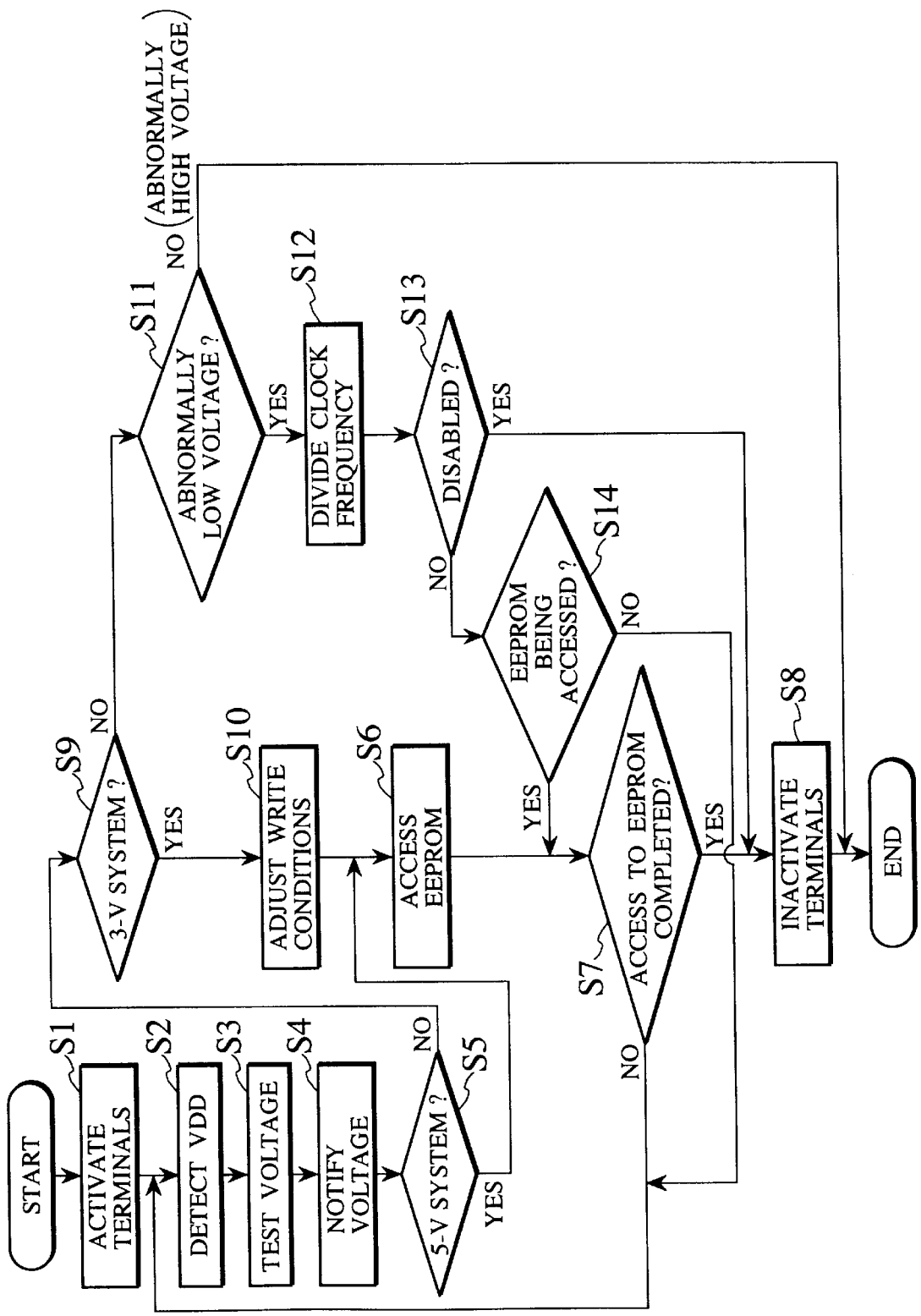
FIG. 5A is a flowchart showing the operation of an IC card according to the first embodiment.
Figure 5B:
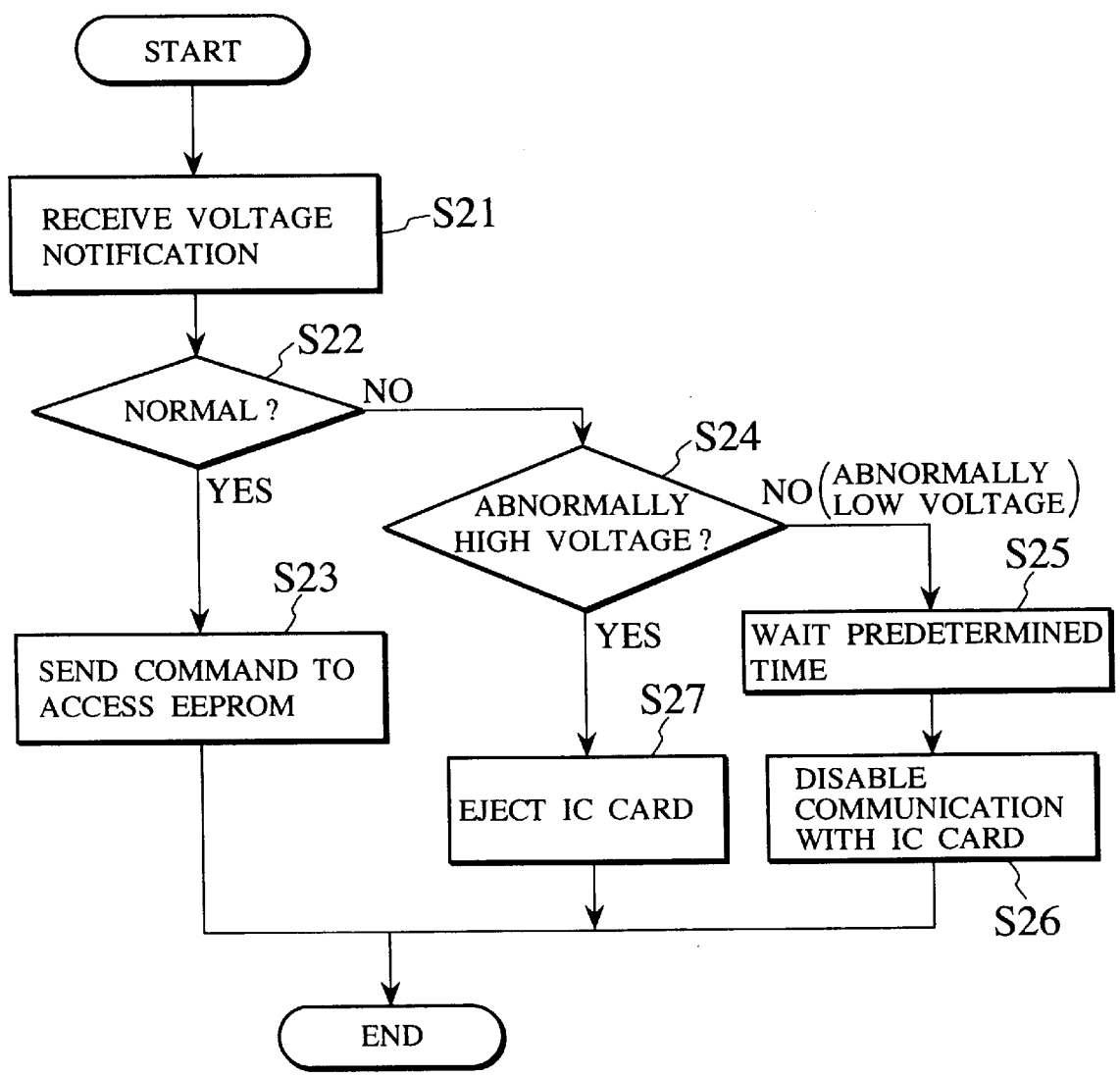
FIG. 5B is a flowchart showing the operation of a reader-writer according to the first embodiment.
Figure 6:
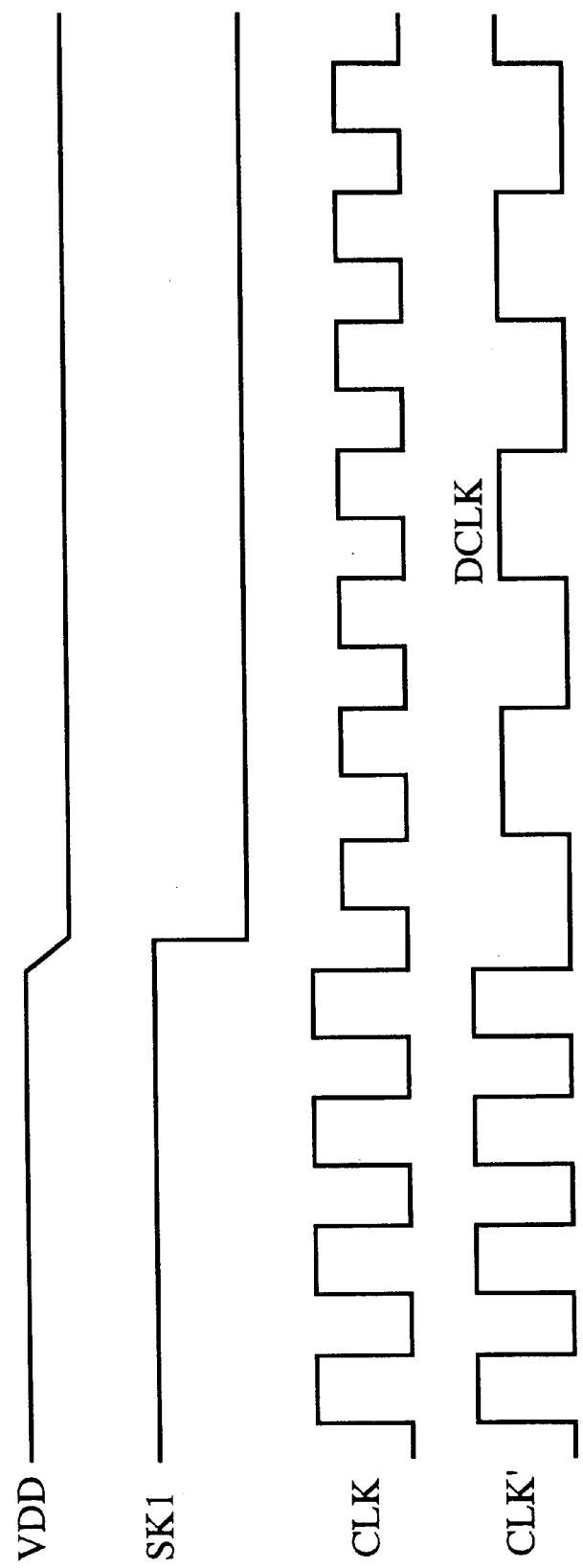
FIG. 6 is a timing chart showing the timing of dividing a clock signal according to the first embodiment.

The operation of the IC card system of the first embodiment will be explained with reference to FIGS. 5A, 5B, and 6, in which FIG. 5A is a flowchart showing the operation of the IC card 10, FIG. 5B is a flowchart showing the operation of the reader-writer 30, and FIG. 6 shows the timing of dividing the clock signal CLK. It is assumed that the IC chip incorporated in the IC card 10 is of a 5-V system.

A physical interface between the IC card 10 and the reader-writer 30 is established when the terminals 11 to 15 of the IC card 10 are connected to the pins 31 to 35 of the reader-writer 30. In step S1, the reader-writer 30 activates the terminals 11 to 14 of the IC card 10 and provides the terminal 11 with the supply voltage VDD, the terminal 12 with the clock signal CLK, the terminal 13 with a low-level signal to reset the IC card, and the terminal 14 with a high-level signal.

In step S2, the voltage detector 18 detects the supply voltage VDD, and the flag holder 19 holds the flags (1) to (4) representing the supply voltage VDD. If the supply voltage VDD is between 4.5 V and 5.5 V, the flag (1) is 0 and the other flags are each 1.

In step S3, the flag holder 19 provides the CPU 16 with a voltage status. The CPU 16 carries out the voltage testing function to determine whether or not the supply voltage VDD is normal.

In step S4, the IC card 10 provides, through the terminal 14, the reader-writer 30 with a reset acknowledgment with a data exchange protocol type (and/or transmission control parameters), and a result of the voltage test.

Operations to be carried out according to the result of the voltage test will be explained.

(I) VDD Being for 5-V System

If the CPU 16 determines that the supply voltage VDD is a normal voltage for a 5-V system, step S5 provides YES, and step S6 starts to access the EEPROM 17a. At this time, the reader-writer 30 starts the operation of FIG. 5B. In step S21, the reader-writer 30 receives the reset acknowledgment with the voltage test result from the IC card 10. Step S22 provides YES because the voltage test result tells that the supply voltage VDD is normal for a 5-V system. In step S23, the reader-writer 30 provides the CPU 16 with a command to access a specific area in the EEPROM 17a. The command specifies the kind of access (for example, a write access), an object file, and the address of the specific area. Upon receiving the command, the CPU 16 provides the reader-writer 30 with status information. Thereafter, the reader-writer 30 sends data through the terminal 14, and the data is written into the specified area in the EEPROM 17a.

Returning to FIG. 5A, step S7 checks to see if the access to the EEPROM 17a is complete. If it is not complete, step S2 and the following steps are repeated. At this time, step S4 does not transmit the data exchange protocol type and/or transmission control parameters because they have already been transmitted. Only a new voltage test result is transmitted to the reader-writer 30. When the access to the EEPROM 17a is complete, the reader-writer 30 inactivates the terminals of the IC card 10 in step S8, to end the operation. Namely, the reader-writer 30 provides the terminal 11 with 0 V, and the terminals 12, 13, and 14 each with a low-level signal.

(II) VDD Being for 3-V System

If the CPU 16 determines that the supply voltage VDD is a normal voltage for a 3-V system, step S9 provides YES. Since the IC chip incorporated in the IC card 10 is of a 5-V system, the CPU 16 adjusts the write conditions of the EEPROM 17a for the 3-V system in step S10. Thereafter, step S6 accesses the EEPROM 17a, and step S8 inactivates the terminals of the IC card 10 to end the operation.

In this way, the first embodiment optimizes the write conditions of the EEPROM 17a in response to the supply voltage VDD, which may be for a 5-V system or 3-V system, thereby stabilizing the operation of the IC card 10 for a wide range of supply voltages without deteriorating the performance thereof.

(III) VDD Being Below 2.5 V

If an accident such as a circuit in the reader-writer 30 is nearly short-circuited occurred, while the IC card is operating with the supply voltage VDD of 5-V system, the supply voltage VDD may drop below 2.5 V. In this case, the CPU 16 determines that the supply voltage VDD is abnormally low in step S3. This voltage test result is notified to the reader-writer 30 in step S4.

In steps S11 and S12 after passing steps S5 and S9, the CPU 16 provides the clock divider 20 with a clock adjusting signal SK1 of low level, to halve the frequency of the clock signal CLK as shown in FIG. 6. The frequency-halved internal clock signal CLK' is supplied to the peripheral circuit 17 and CPU 16.

On the other hand, the reader-writer 30 passes steps S21, S22, and S24 of FIG. 5B in response to the voltage test result indicating the abnormally low voltage. Step S25 waits for a predetermined time, and step S26 disables communication with the IC card 10. If the communication with the IC card 10 is disabled while data is being written into the EEPROM 17a, erroneous data will be written into there. To prevent this and to correctly write data into the EEPROM 17a, step S25 waits for the predetermined time during which the write operation on the EEPROM 17a will be completed, and then, step S26 disables the communication.

If the supply voltage VDD becomes abnormally low during a write operation on the EEPROM 17a, this embodiment does not disable the communication between the IC card 10 and the reader-writer 30 at once. Namely, before disabling the communication, step S14 determines whether or not the EEPROM 17a is being accessed. If step S14 provides YES, step S7 is carried out and the IC card returns to step S2. Thereafter, steps S11 and S13 are repeated until the access to the EEPROM 17a is complete. The operation during this period is carried out with the frequency-halved internal clock signal CLK'. Accordingly, the frequency of the clock signal CLK' never exceeds the operating frequency of the CPU 16 under the abnormally low supply voltage, and therefore, the CPU 16 stably carries out the write operation on the EEPROM 17a.

After the predetermined time, the reader-writer 30 disables the communication with the IC card 10. Then, step S13 of FIG. 5A provides YES, and step S8 inactivates the terminals of the IC card 10, to end the operation.

If no write operation on the EEPROM 17a is being carried out when the supply voltage VDD becomes abnormally low, step S14 provides NO, and the IC card returns to step S2. Then steps S11 and S13 are repeated until the communication is disabled. During this period, the frequency-halved internal clock signal CLK' is used, so that the frequency of the clock signal CLK' never exceeds the operating frequency of the CPU 16. As a result, the CPU 16 never becomes out of control, and data in the EEPROM 17a will never be destroyed. Generally, the operating frequency of the CPU 16 drops if the supply voltage VDD drops. As a result, the frequency of the clock signal CLK exceeds the operating frequency of the CPU 16 in the prior art. If a write operation is carried out under this condition, it will be destabilized. Even if no write operation is carried out at this moment, the CPU 16 may become out of control and may carry out an erroneous write operation to destroy data in the EEPROM 17a. To prevent this problem, the first embodiment halves the frequency of the clock signal CLK when the supply voltage VDD drops abnormally. The frequency of this frequency-halved clock signal never exceeds the operating frequency of the CPU 16, and therefore, a write operation on the EEPROM 17a is correctly carried out.

(IV) VDD Being Above 5.5 V

If the CPU 16 determines, in step S3, that the supply voltage VDD is abnormally high above 5.5 V, step S4 notifies the reader-writer 30 of this matter. Then IC card passes steps S5 and S9, and step S11 provides NO. The reader-writer 30 passes steps S21, S22, and S24, and in step S27, ejects the IC card 10. In this way, the reader-writer 30 quickly ejects the IC card 10 if the supply voltage VDD is abnormally high. This results in minimizing damage on the IC card 10.

(Second Embodiment)

Figure 7A:
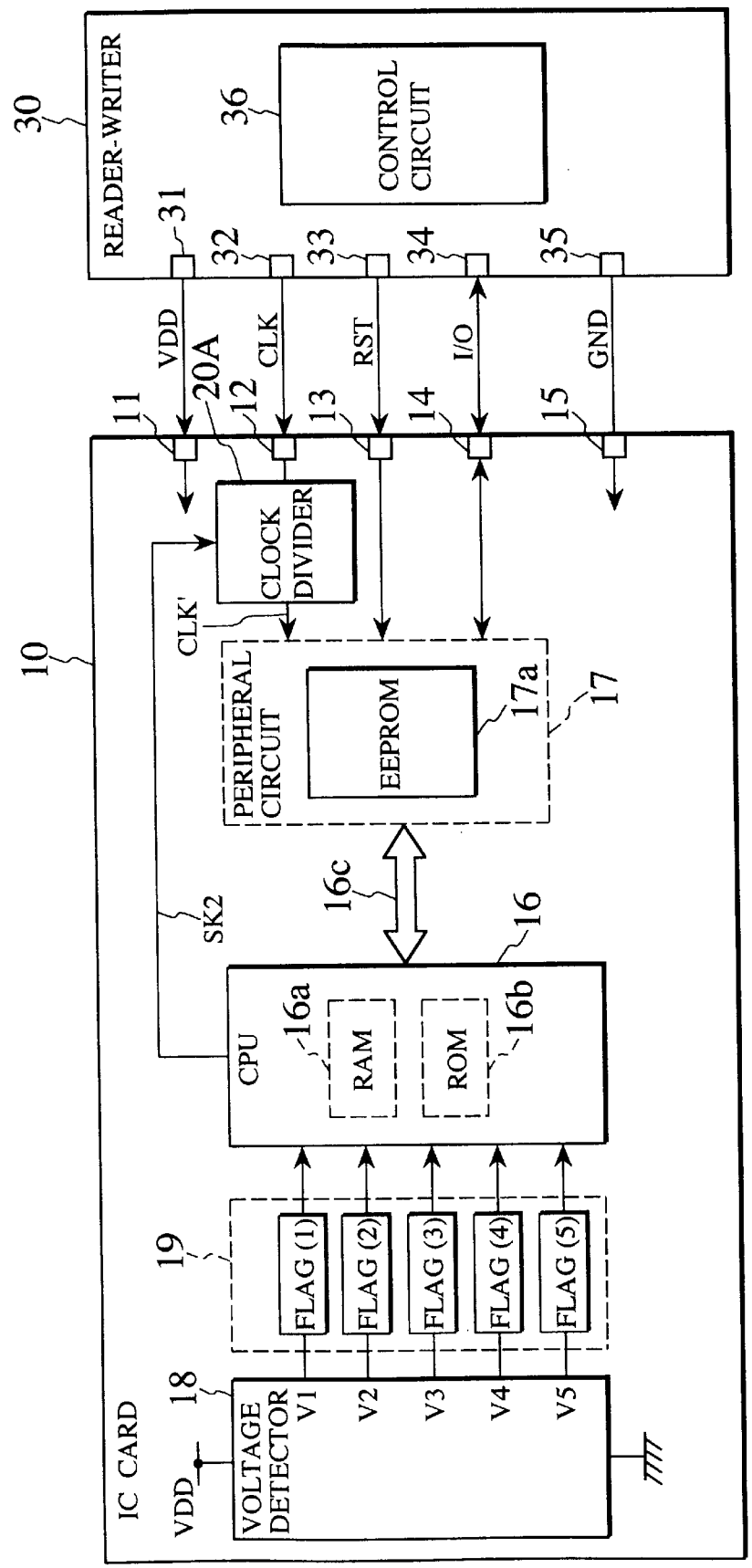
FIG. 7A is a block diagram showing an essential part of an IC card system according to a second embodiment of the present invention.
Figure 7B:
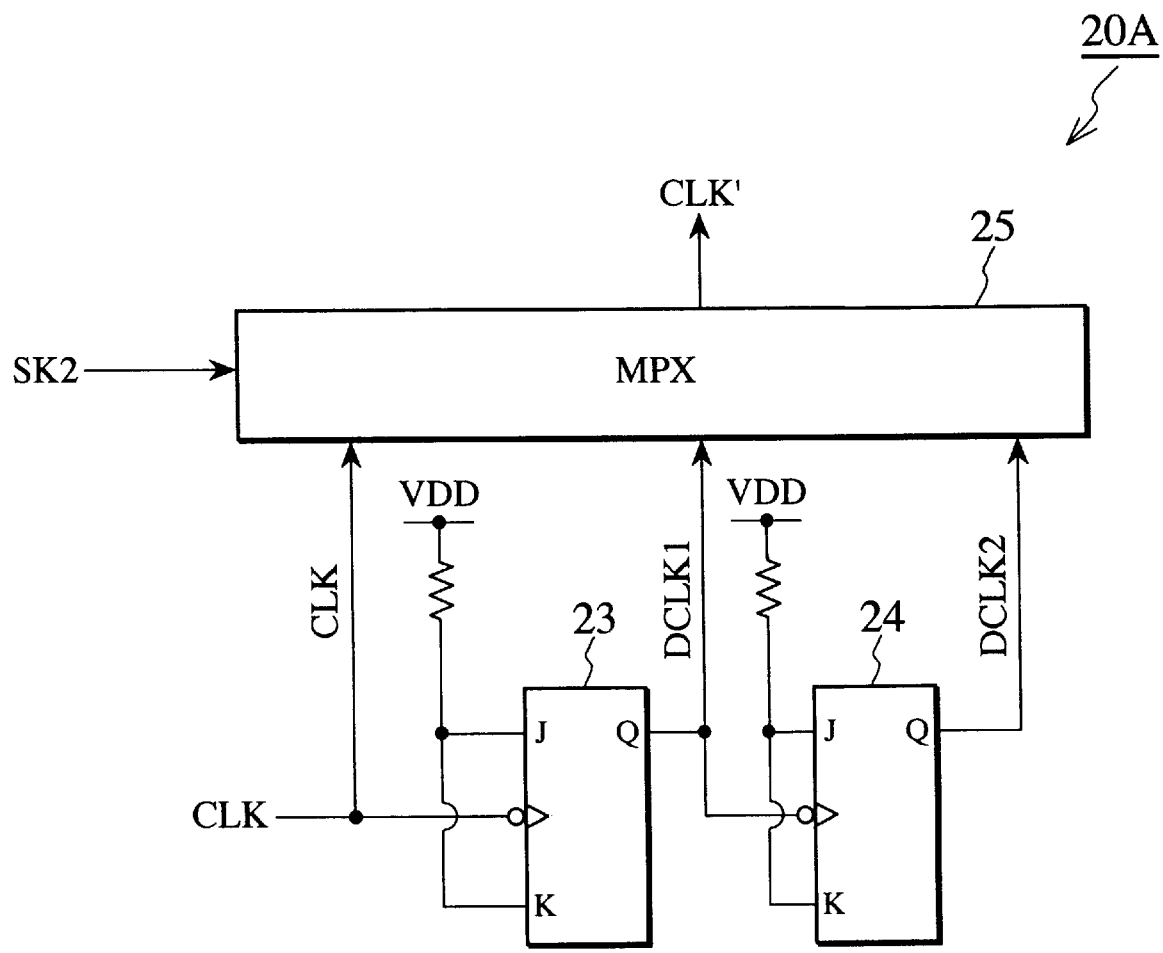
FIG. 7B is a circuit diagram showing a clock divider according to the second embodiment.
Figure 8:
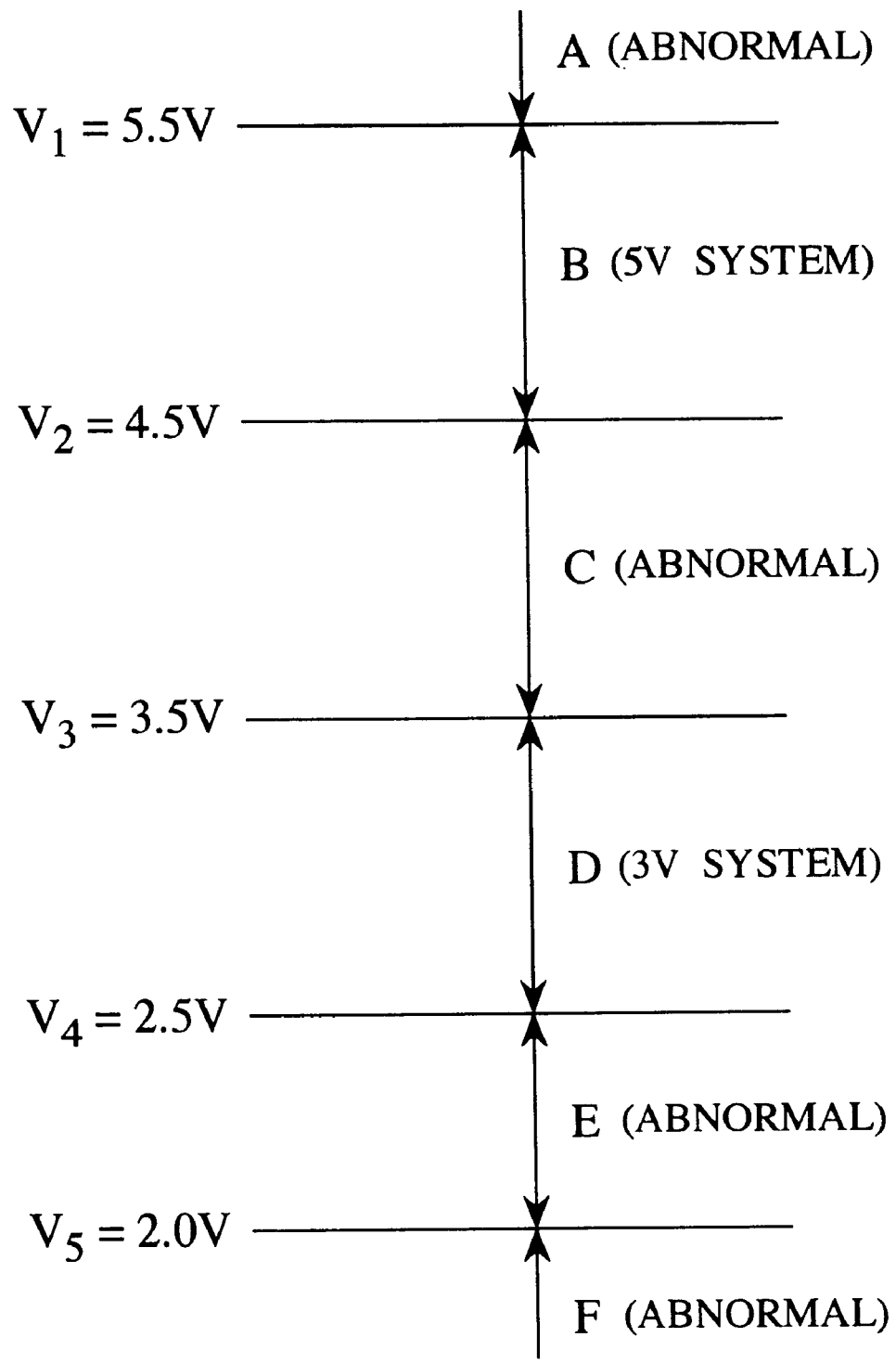
FIG. 8 shows reference voltages for testing a supply voltage according to the second embodiment.

FIG. 7A is a block diagram showing an essential part of an IC card system according to the second embodiment of the present invention. The same parts as those of FIG. 3A are represented with like reference numerals and are not explained again. A reader-writer 30 provides an IC card 10 with a clock signal CLK. A clock divider 20A divides the clock signal CLK in two steps, and generates two frequency-divided clock signals having different frequencies, depending on two kinds of abnormally low supply voltages. FIG. 7B shows the details of the clock divider 20A. FIG. 8 shows five reference voltages $V_1$ to $V_5$ used by a voltage detector 18A. A flag holder 19A holds a voltage status in response to the output of the voltage detector 18A. The clock divider 20A divides the frequency of the clock signal CLK by 2 or by 4. These are parts that are different from the first embodiment. In addition, a voltage testing function of a CPU 16 of the second embodiment differs from that of the first embodiment.

The reference voltages $V_1$ to $V_5$ of FIG. 8 are 5.5 V, 4.5 V, 3.5 V, 2.5 V, and 2.0 V, respectively. Accordingly, the flag holder 19A has five flags (1) to (5), and the CPU 16 employs additional two abnormal ranges, i.e., a range E between 2.5 V and 2.0 V and a range F below 2.0 V, as shown in FIG. 8. The reference voltages may be changed as and when required.

Figure 9:
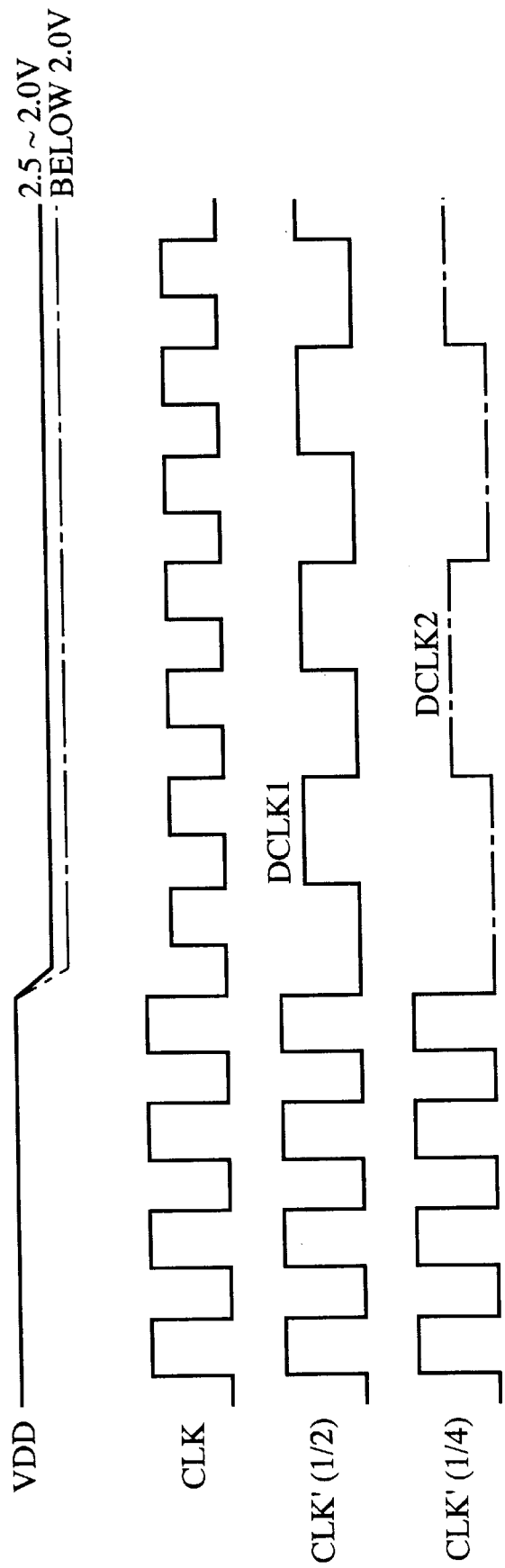
FIG. 9 is a timing chart showing the timing of dividing a clock signal according to the second embodiment.

In FIG. 7B, the clock divider 20A consists of two J-K flip-flops 23 and 24 and a multiplexer (MPX) 25 that is controlled by a clock adjusting signal SK2 provided by the CPU 16. FIG. 9 is a timing chart showing the timing of dividing the clock signal CLK. The J-K flip-flop 23 divides the frequency of the clock signal CLK by 2 and provides a frequency-halved clock signal DCLK1. The J-K flip-flop 24 divides the frequency of the clock signal CLK by 4 and provides a frequency-quartered clock signal DCLK2. The multiplexer 25 selects one of the clock signals CLK, DCLK1, and DCLK2 and supplies the selected one as an internal clock signal CLK'.

Figure 10:
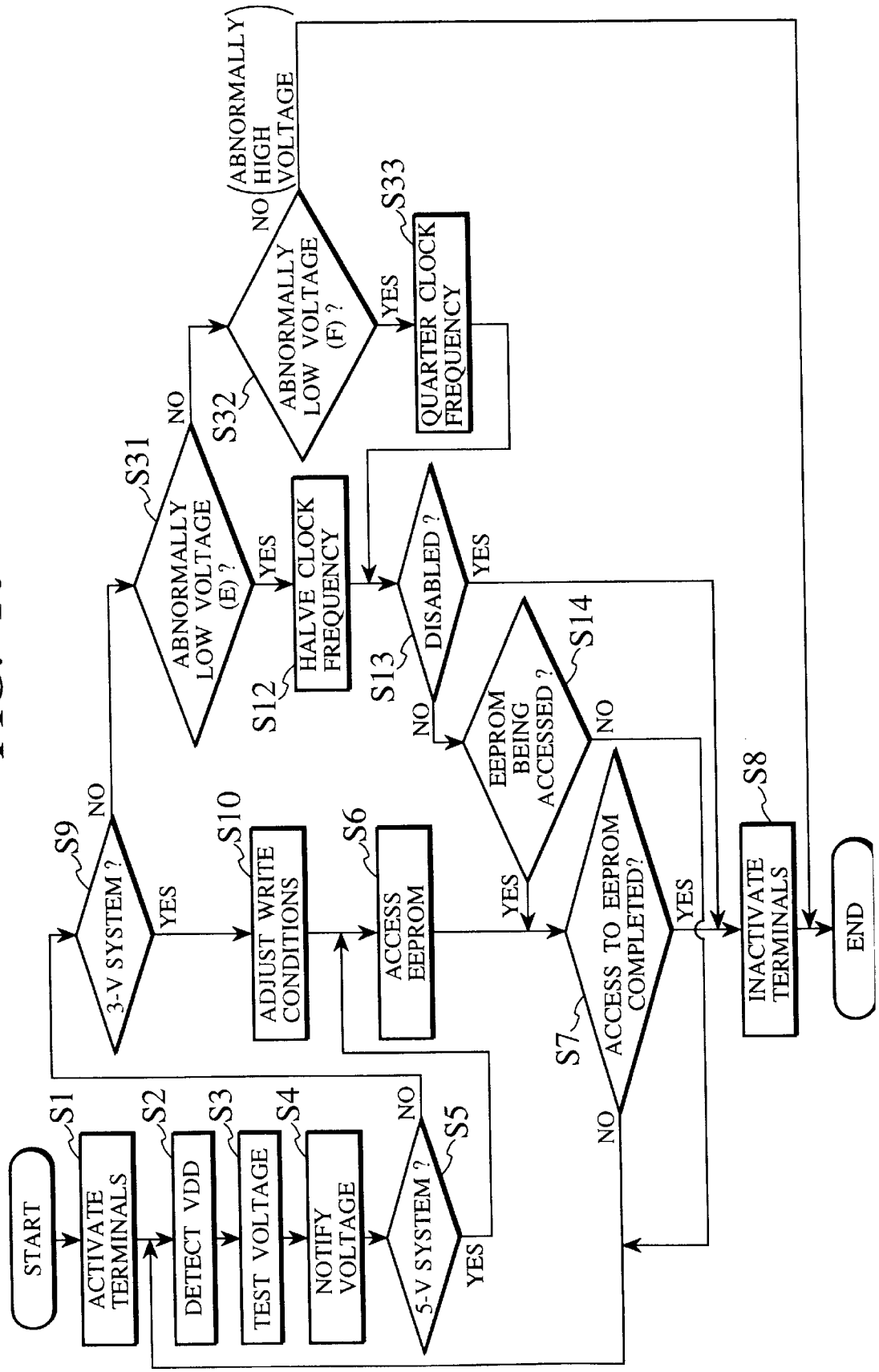
FIG. 10 is a flowchart showing the operation of the second embodiment.

FIG. 10 is a flowchart showing the operation of the IC card 10 according to the second embodiment. The same steps as those of FIG. 5A are represented with like step numbers and are not explained again. The operation of the reader-writer 30 is the same as that of FIG. 5B, and therefore, is not explained again.

If the CPU 16 determines, in step S31, that the supply voltage VDD is abnormally low in the range E between 2.5 V and 2.0 V, step S12 divides the frequency of the clock signal CLK by 2 to provide the frequency-halved clock signal DCLK1, and step S13 is carried out. If step S32 determines that the supply voltage VDD is abnormally low in the range F below 2.0 V, step S33 divides the frequency of the clock signal CLK by 4 to provide the frequency-quartered clock signal DCLK2. Thereafter, step S13 is carried out. The other steps are the same as those of the first embodiment.

In this way, the second embodiment divides the clock signal CLK to generate two different frequency-divided clock signals DCLK1, DCLK2 and selects a proper one of the frequency-divided clock signals according to the state of the supply voltage VDD. As a result, the frequency of the internal clock signal CLK' never exceeds the operating frequency of the CPU 16 even if the supply voltage VDD drops abnormally. The second embodiment, therefore, carries out a write operation on an EEPROM 17a more securely than the first embodiment.

(Third Embodiment)

Figure 11:
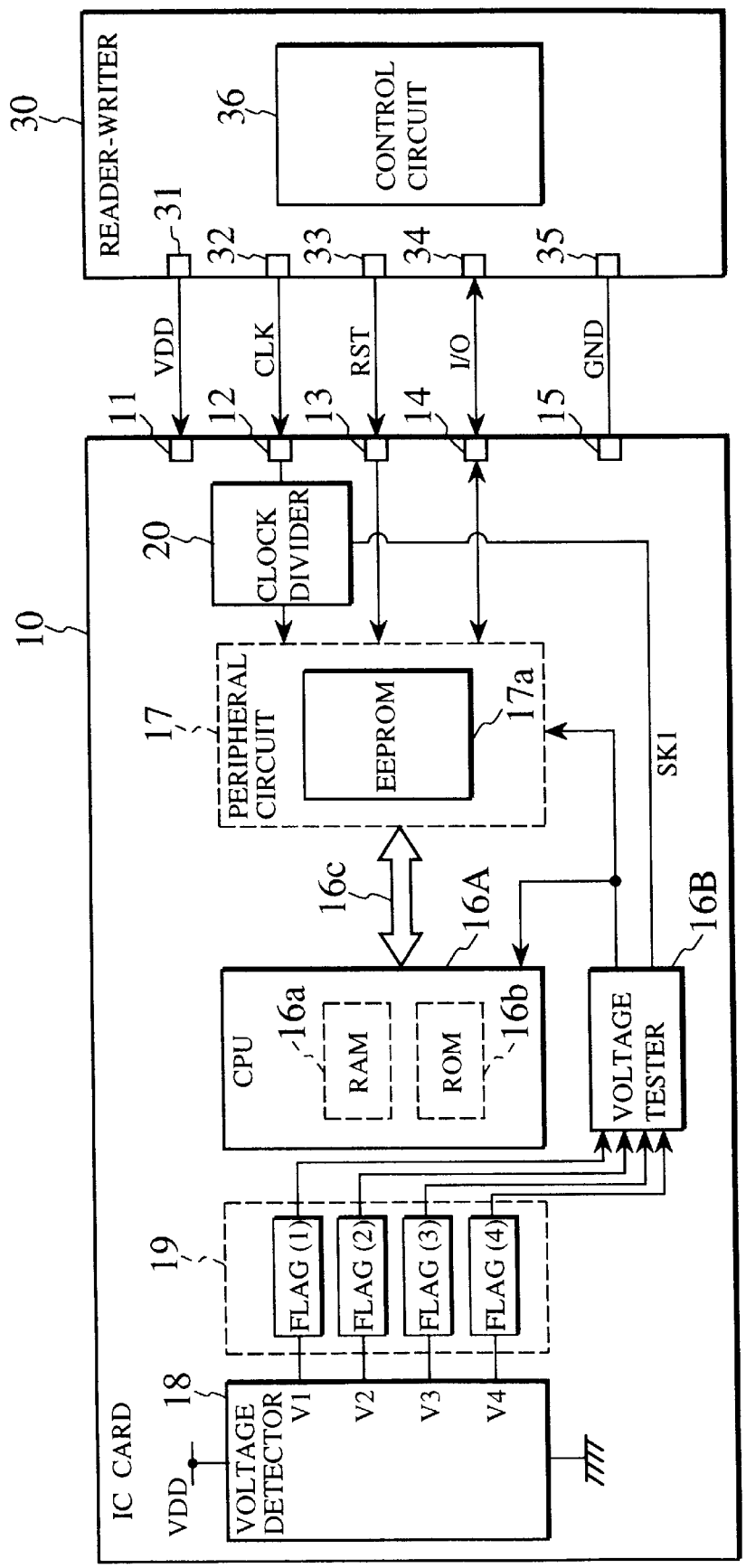
FIG. 11 is a block diagram showing an essential part of an IC card system according to a third embodiment of the present invention.

FIG. 11 is a block diagram showing an essential part of an IC card system according to the third embodiment. The same parts as those of FIG. 3A are represented with like reference numerals and are not explained again.

An IC card 10 has a CPU 16A and a separate voltage tester 16B. Namely, the voltage testing function accomplished by the CPU 16 in the first and second embodiments is realized by hardware 16B that is disposed outside the CPU 16A in the third embodiment. The IC card 10 also has a peripheral circuit 17 having a memory 17a for storing data and a voltage detector 18 for detecting a supply voltage VDD applied by an external unit, i.e., a reader-writer 30. The CPU 16A controls various operations including an access operation on the memory 17a. The voltage tester 16B tests a voltage detected by the voltage detector 18. The CPU 16A has an adjuster for adjusting the peripheral circuit 17 in response to a result of the voltage test. Since the voltage tester 16B is outside the CPU 16A, the output of a flag holder 19 is supplied to the voltage tester 16B, which provides a clock adjusting signal SK1 to a clock divider 20. The CPU 16A, peripheral circuit 17, voltage detector 18, flag holder 19, voltage tester 16B and clock divider 20 are monolithically integrated on a single semiconductor chip to constitute a semiconductor IC. The voltage tester 16B also provides a signal representing a voltage test result. This signal is supplied to the CPU 16A and peripheral circuit 17. The third embodiment provides the same effect as the first embodiment.

Various modifications will become possible for those skilled in the art after receiving the teachings of the present disclosure without departing from the scope thereof. For example, the voltage testing hardware (16B) of the third embodiment is applicable to the second embodiment. Although the first to third embodiments relate to the IC card that has exposed terminals to be connected to a reader-writer, the present invention is also applicable to non-contact-type IC cards such as electromagnetic-type IC cards. Further, the present invention is applicable to an analog circuit incorporated in a peripheral circuit of an IC card, to cope with a fluctuation in the operating conditions of the analog circuit due to a change in a supply voltage. Although the IC cards explained in the first to third embodiments contain a single-chip semiconductor IC, the IC cards can include a plurality of semiconductor chips. The CPU, peripheral circuit, voltage detector, clock divider and another miscellaneous circuit may be formed on separate chips, respectively.

What is claimed is:

1. An integrated circuit (IC) for an IC card compatible with different supply voltages, comprising:
   (a) means for detecting a plurality of supply voltages applied by external units;
   (b) means for testing whether the detected supply voltage applied from one of the external units is within one of a plurality of normal voltage ranges for the IC card or within abnormal voltage ranges; and
   (c) means for changing a clock frequency so as to adjust a given circuit incorporated in the IC card only when a result of the supply voltage test indicates a predetermined normal voltage range;
   wherein the plurality of normal voltage ranges comprises higher and lower voltage ranges, and the clock frequency changing means decreases the clock frequency only when the result of the supply voltage test indicates the lower voltage range.

2. The IC of claim 1, further comprising:
   means for notifying the result of the supply voltage test to the one of external units.

3. The IC of claim 1, wherein the clock frequency changing means has means for adjusting, according to the result of the supply voltage test, an access condition of a memory incorporated in the given circuit.

4. The IC of claim 1, wherein the clock frequency changing means sends, according to the result of the supply voltage test, a signal to clock dividing means incorporated in the IC card.

5. An IC card compatible with different supply voltages applied by external units, comprising:
a peripheral circuit having a memory for storing data;
a central processing unit (CPU) for controlling the operation of the peripheral circuit;
means for detecting the plurality of supply voltages;
means for testing whether the detected supply voltage applied from one of the external units is within one of a plurality of normal voltage ranges for the IC card or within abnormal voltage ranges; and
means for changing a clock frequency so as to adjust a given circuit incorporated in the IC card, only when a result of the supply voltage test indicates a predetermined normal voltage range;
wherein the plurality of normal voltage ranges comprises higher and lower voltage ranges, and the clock frequency changing means decreases the clock frequency only when the result of the supply voltage test indicates the lower voltage range.

6. The IC card of claim 5, wherein the CPU further includes means for notifying the one of the external units of the result of the supply voltage test.

7. The IC card of claim 5, further comprising means connected to the CPU and peripheral circuit, for dividing the frequency of a clock signal.

8. The IC card of claim 5, wherein the adjusting means has means for adjusting an access condition of the memory according to the result of the supply voltage test.

9. The IC card of claim 5, wherein the adjusting means is connected to the clock dividing means.

10. The IC card of claim 7, wherein the clock dividing means divides the frequency of the clock signal in two steps.

11. An IC card system having an IC card compatible with different supply voltages, and external units for applying the different supply voltages and sending a clock signal to the IC card, wherein,
(a) the IC card comprising:
a peripheral circuit having a memory for storing data;
a central processing unit (CPU) for controlling the operation of the peripheral circuit, the CPU comprising:
means for testing whether the detected supply voltage applied from one of the external units is within one of a plurality of normal voltage ranges for the IC card or within abnormal voltage ranges; and
means for adjusting a given circuit incorporated in the IC card, only when a result of the supply voltage test indicates a predetermined normal voltage range, and
means for detecting the plurality of supply voltages; and
(b) the external units, each comprising abnormality handling means for disabling communication between the IC card and one of the external units or ejecting the IC card if the detected supply voltage is abnormal;
wherein the plurality of normal voltage ranges comprises higher and lower voltage ranges, and the clock frequency changing means decreases the clock frequency only when the result of the supply voltage test indicates the lower voltage range.

12. The IC card system of claim 11, wherein the CPU further includes:
means for notifying the result of the voltage test to the one of external units.

13. The IC card system of claim 11, further comprising means connected to the CPU and peripheral circuit, for dividing the frequency of the clock signal.

14. The IC card system of claim 12, further comprising means connected to the CPU and peripheral circuit, for dividing the frequency of the clock signal.

15. The IC card system of claim 12, wherein the adjusting means has means for adjusting the access conditions of the memory.

16. The IC card system of claim 15, further comprising means connected to the CPU and peripheral circuit, for dividing the frequency of the clock signal.

17. The IC card system of claim 12, wherein the abnormality handling means quickly ejects the IC card if the result of the supply voltage test indicates an abnormally high voltage.

18. The IC card system of claim 12, wherein the abnormality handling means disables communication between the external unit and the IC card at proper timing if the result of the supply voltage test indicates an abnormally low voltage.

19. The IC card system of claim 13, wherein the clock dividing means divides the frequency of the clock signal in two steps.

20. The IC card system of claim 14, wherein the clock dividing means divides the frequency of the clock signal in two steps.

21. An IC card system having an IC card compatible with different supply voltages, and external units for applying the different supply voltages and sending a clock signal to the IC card, wherein,
(a) the IC card comprising:
a peripheral circuit having a memory for storing data;
a central processing unit (CPU) for controlling the operation of the peripheral circuit, the CPU comprising:
means for testing whether the detected supply voltage applied from one of the external units is within one of a plurality of normal voltage ranges for the IC card or within abnormal voltage ranges; and
means for adjusting a given circuit incorporated in the IC card, only when a result of the supply voltage test indicates a predetermined normal voltage range, and
means for detecting the plurality of supply voltages; and
(b) the external units comprising a first external unit supplying a first supply voltage and a second external unit supplying a second supply voltage lower than the first supply voltage, and the clock frequency changing means decreases the clock frequency only when the result of the supply voltage test indicates the second supply voltage lying in the predetermined normal voltage range, each of the external units comprising abnormality handling means for disabling communication between the IC card and one of the external units or ejecting the IC card if the detected supply voltage is abnormal.

* * * * *